May 9, 1933.  E. G. CHAPPELOW ET AL  1,908,404
CULTIVATOR BLADE
Filed Aug. 8, 1931  2 Sheets-Sheet 2
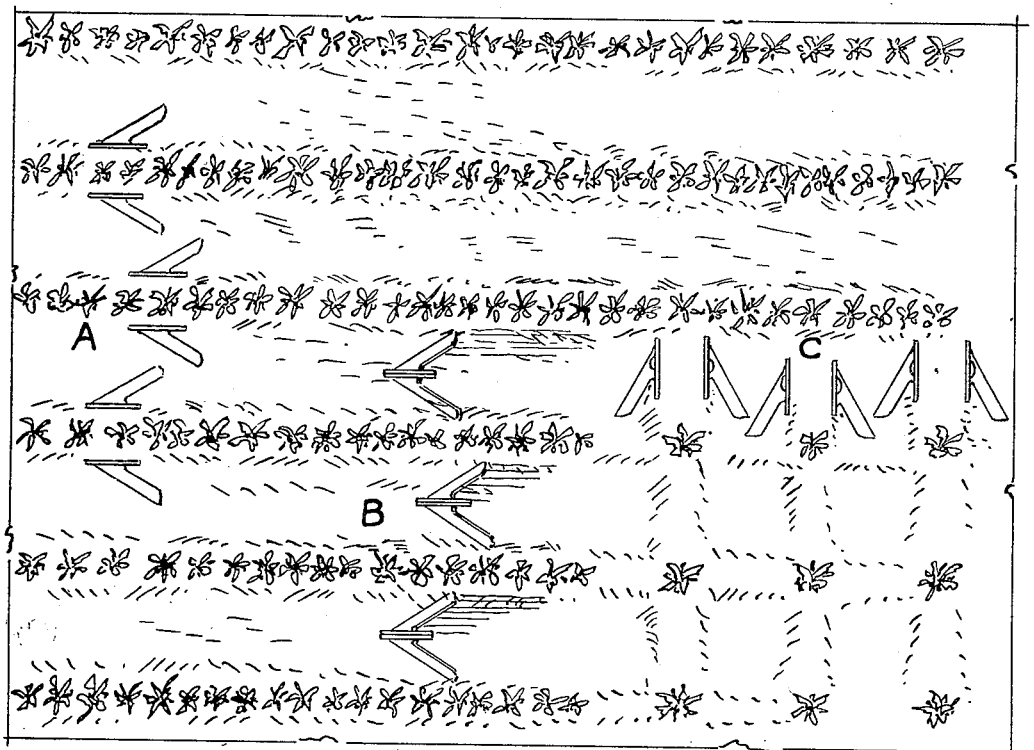
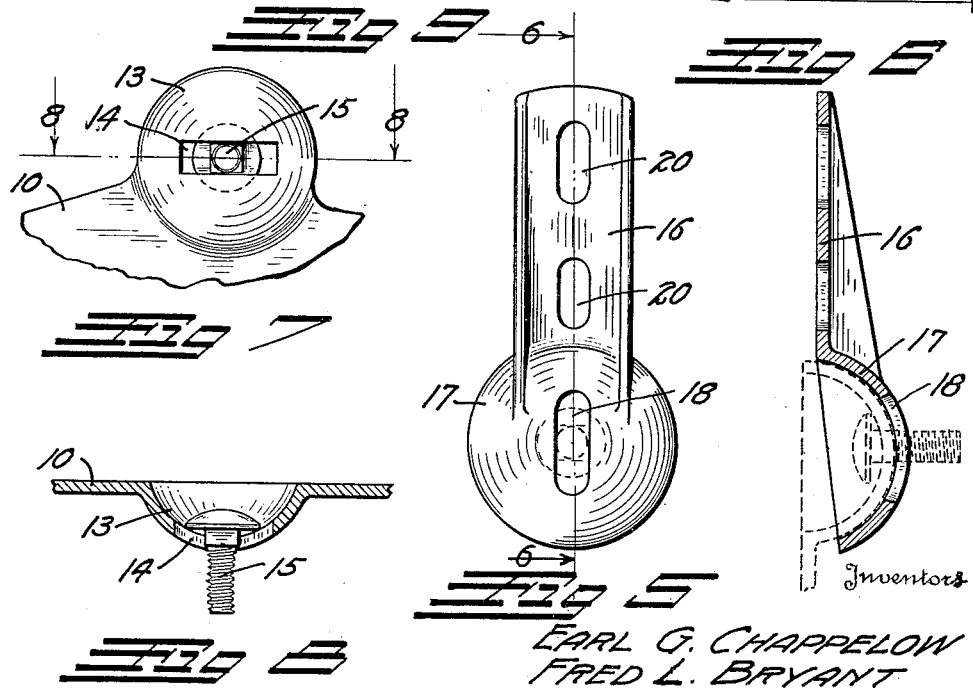
Inventors
EARL G. CHAPPELOW
FRED L. BRYANT
By
Attorney

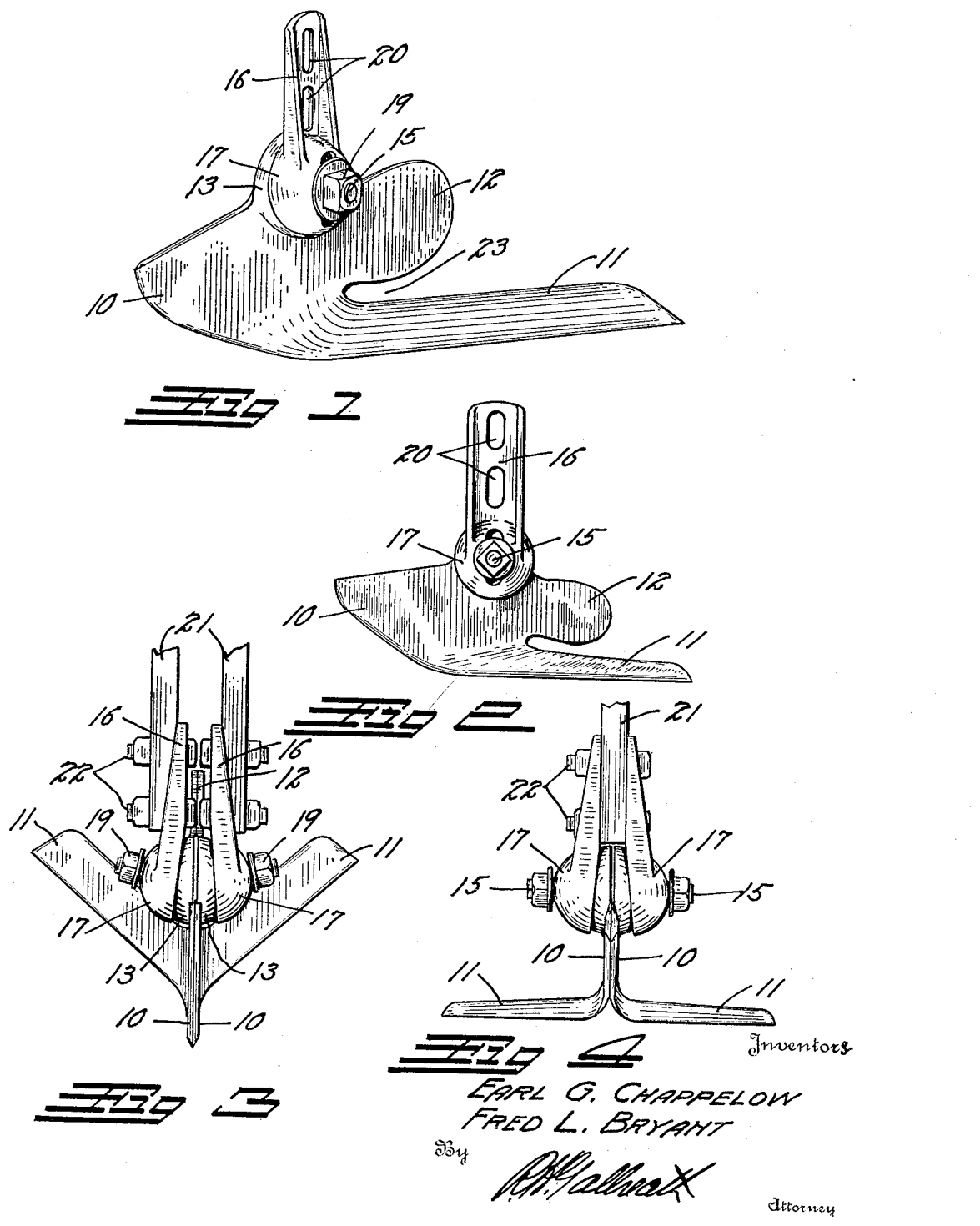

UNITED STATES PATENT OFFICE

EARL G. CHAPPELOW AND FRED L. BRYANT, OF GREELEY, COLORADO

CULTIVATOR BLADE

Application filed August 8, 1931. Serial No. 555,878.

This invention relates to an improved cultivator blade and has for its principal object the provision of a blade which will have a universal adjustment so that it can be turned to run parallel with the ground or at an upward or downward angle depending upon the particular ground being cultivated.

Other objects of the invention are to provide a cultivator blade:—

Which can be run substantially horizontal so as to cut the weeds and yet which will shield and protect the young growing plants from cods, dirt, etc.;

Which can be reversed and adjusted so that crops requiring hilling may be perfectly hilled;

Which can be set to leave the ground level and throw the soil either way;

Which will not stir up the ground around the plants so as to leave the tender roots exposed to the hot sun and wind;

Which can be adjusted to form a ditching blade which will form a perfect ditch of any desired depth or width and leave the ditch clean with a continuous uniform bank along the sides;

Which can be adjusted to form what is known as a "duck foot" for weeding between rows;

And which can be adjusted for blocking or thinning such plants as beets, cotton, etc.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a perspective view illustrating one of the improved cultivator blades. This view illustrates what is termed the "left" blade. The "right" blade would be similar except all the parts would be oppositely positioned.

Fig. 2 is a side elevation of the blade of Fig. 1.

Fig. 3 illustrates a front view of a "right" and "left" blade positioned together to form a ditching plow.

Fig. 4 illustrates a "right" and "left" blade mounted on a single cultivator standard to form a "duck foot" for weeding.

Fig. 5 is a face elevation of the standard bracket.

Fig. 6 is a vertical section through the bracket taken on the line 6—6, Fig. 5.

Fig. 7 is a detail face view of the universal boss formed on the cultivator blade.

Fig. 8 is a horizontal section through the boss taken on the line 8—8, Fig. 7.

Fig. 9 is a diagrammatic view illustrating the action of the tool in cultivating, hilling and blocking typical plant rows.

The blades are used in pairs, one being a "right" hand blade, the other a "left" hand. Each blade proper comprises a forwardly extending cutting blade 10 having a sharpened undercut front edge. The blade 10 turns outwardly and rearwardly at the bottom to form a relatively narrow knife 11. The knife 11 has a sharpened front edge which is a continuation of the front edge of the blade 10. Extending rearwardly of the blade 10 and in substantially the same plane is a shield 12.

Intermediate the blade 10 and the shield 12 a semi-spherical boss 13 is formed. The boss 13 projects from the vertical face of the blade on the same side as the knife 11. It is preferred to form this boss by indenting the metal of the blade. It, of course, could be formed by attaching a hemispherical member to the blade. It is much more satisfactory and economical, however, to form it of the blade material itself. The boss 13 is provided with a horizontally extending, rectangular slot 14 arranged to snugly engage the square shank of a carriage type bolt 15.

The blade is supported from a bracket member 16 provided at lower extremity with a semi-spherical socket 17 arranged to closely enclose the boss 13. The socket is provided with a vertical slot 18 for receiving the stem of the bolt 15. A suitable nut 19 clamps the boss 13 in the socket 17.

It will be noted that by this construction the movement of the bolt 15 in the slot 18 allows the blade to swing in a vertical arc and movement of the bolt 15 in the slot 14 allows it to swing in a horizontal arc. The blade can be moved at any angle in between these two arcs since the bolt can move freely in both slots at the same time. It is, of course, understood that the placing of the slot 14 horizontally and the slot 18 vertically is simply a matter of choice since they could be reversed or placed at any angle provided they are arranged so as to be normally at an angle to each other.

The bracket member 16 is provided with a pair of slotted openings 20 for the reception of the usual clamp bolts carried by the usual cultivator standards. Typical standards are indicated at 21 with their clamp bolts at 22. The blades can be attached to the standards of any of the usual cultivators.

When employed for cultivating such plants as sugar beets they are aranged in pairs of opposite hand so that the blades 10 will travel on opposite sides of the plant rows, as shown at "A", Fig. 9. As they are drawn along the row the sharp front edges of the blades 10 cut the soil along each side of the plant row so as to prevent disturbing the soil around the roots. The knives 11 then pass under the soil between the rows so as to cut the weeds and stir the soil.

It is desired to call attention to the V-shaped opening 23 betwen the knives 11 and the shields 12. This opening is substantially V-shaped, that is it is relatively narrow toward the front of the blade and widens out toward the rear. This may seem to be an arbitrary arrangement. It has, however, great importance. It allows the comparatively fine soil to sift through the V close to the shield 10 and close to the plant row. The larger clods can not pass through the slot until they have traveled further outward along the knives 11 so that they will be deposited a sufficient distance from the row to prevent them from rolling over on and covering the young plants.

Normally the knives 11 are set so as to travel at a slightly upwardly inclined angle which will serve to properly weed and loosen the soil. In trashy ground, however, the blades can be turned at a rather abrupt angle so that they will automatically clear themselves.

For hilling operations the blades may be reversed as shown at "B", Fig. 9, so that the soil will be separated between the rows and carried toward and piled along the rows. The latter positioning of the blades is similar for forming ditches between the rows except in the latter case the knives 11 are turned abruptly upward at their rears as shown in Fig. 3. The blades 10 then serve to part the soil and the knives serve to shape and form a V-shaped ditch between rows depositing the soil along the plants. This ditch can be made any desired depth, width, or angle, by simply changing the angle of the blades.

Should it be desired to form what is commonly known as a "duck foot" for weeding between close rows, the brackets 16 of a right and left blade can be attached to opposite sides of a single cultivator standard 21 as shown in Fig. 4. This will bring the two blades closely together so that they will function as a unit.

Should it be desired to block or thin rows of plants such as sugar beets, or cotton, the blades are secured to the cultivator as shown at "C", Fig. 9, so that their knives will overlap and so that the desired width of block will be left between the blades 10. The cultivator is then drawn laterally across the blade rows so that blocks of plants will be left in each row between the blades and shields 10 and 12. During the blocking operation the plants remaining in the blocks are protected by the shields 12 from the disturbed soil. The roots of the remaining plants are not disturbed in any way nor left exposed since the blades 10 sharply sever the disturbed soil from the undisturbed in the block.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A cultivator blade comprising: a vertically placed forwardly extending blade; a substantially horizontal knife portion extending outwardly and rearwardly from one side of said blade, the forward edge of said knife portion acting as a continuation of the forward edge of said blade; a rearwardly extending shield formed on said blade and lying substantially in the same plane therewith; a semi-spherical boss projecting from said blade; a bracket member; a semi-spherical socket formed in said bracket member and arranged to receive said boss, said boss projecting from the same side of said blade as said knife member projects; and a bolt passing through said boss and through said socket member and adapted to clamp the two together.

2. A cultivator blade comprising: a vertically placed forwardly extending blade; a substantially horizontal knife portion extending outwardly and rearwardly from one side of said blade, the forward edge of said knife portion acting as a continuation of the forward edge of said blade; a rearwardly extending shield formed on said blade and lying substantially in the same plane therewith; a semi-spherical boss projecting from said blade; a bracket member; a semi-spherical socket formed in said bracket member and arranged to receive said boss, said boss projecting from the same side of said blade as said knife member projects; and a bolt passing through said boss and through said socket member and adapted to clamp the two together, the openings in said members for the reception of said bolt being sufficiently large to allow said boss to have a universal movement in said socket.

3. A cultivator blade comprising: a vertically placed forwardly extending blade; a substantially horizontal knife portion extending outwardly and rearwardly from one side of said blade, the forward edge of said knife portion acting as a continuation of the forward edge of said blade; a rearwardly extending shield formed on said blade and lying substantially in the same plane therewith; a semi-spherical boss projecting from said blade; a bracket member; a semi-spherical socket formed in said bracket member and arranged to receive said boss, said boss projecting from the same side of said blade as said knife member projects, a bolt passing through said boss and through said socket member and adapted to clamp the two together; an elongated opening for the passage of said bolt through said boss; and a second elongated opening for the passage of said bolt through said socket member, said two openings being positioned at an angle to each other so as to allow universal movement of said boss in said socket member.

4. In a cultivator blade having a substantially vertical blade portion joined to an outwardly extending knife section, a ball shaped boss projecting outwardly from said vertical blade portion on the same side with said knife section; an apertured bracket adapted to be secured to a cultivator standard; a socket member formed on the lower portion of said bracket; and means for securing said boss in said socket member.

In testimony whereof, we affix our signatures.

EARL G. CHAPPELOW.
FRED L. BRYANT.